United States Patent [19]
Stein, Jr.

[11] 4,088,839
[45] May 9, 1978

[54] TELEPHONE CALL TIMER

[76] Inventor: Anthony C. Stein, Jr., 3807 Pineland St., Fairfax, Va. 22030

[21] Appl. No.: 621,747

[22] Filed: Oct. 14, 1975

[51] Int. Cl.² ............................................ H04M 15/00
[52] U.S. Cl. ............................... 179/7.1 R; 58/152 T
[58] Field of Search ............. 179/7 R, 7.1 R, 7.1 TP, 179/84 L; 58/39.5, 152 T; 340/309.1, 309.4

[56] References Cited

U.S. PATENT DOCUMENTS

| | | | |
|---|---|---|---|
| 2,629,781 | 2/1953 | Feinstein | 179/7.1 R |
| 3,089,303 | 5/1963 | Dahl | 179/7.1 R |
| 3,136,114 | 6/1964 | Jauch | 58/39.5 |
| 3,184,551 | 5/1965 | Curtis, Jr. | 179/7.1 R |
| 3,459,900 | 8/1969 | Alster et al. | 179/84 L |
| 3,508,392 | 4/1970 | Temps, Jr. | 179/7.1 R |
| 3,512,355 | 5/1970 | Lang | 179/7.1 R |
| 3,573,378 | 4/1971 | Leyburn et al. | 179/7.1 R |
| 3,590,161 | 6/1971 | Jacobs | 179/7.1 R |
| 3,819,873 | 6/1974 | Stockton et al. | 179/84 L |
| 3,882,670 | 5/1975 | Woolley | 58/145 K |
| 3,934,240 | 1/1976 | Norling | 340/309.4 |

Primary Examiner—Kathleen H. Claffy
Assistant Examiner—Gerald L. Brigance
Attorney, Agent, or Firm—Cameron, Kerkam, Sutton, Stowell & Stowell

[57] ABSTRACT

This invention relates to a timing unit for detachable mounting upon a conventional telephone instrument, having for its purpose the measuring of a predetermined time cycle and the emission of a signal, or a succession of time-spaced signals, when overtime charges are accumulating or are about to begin.

4 Claims, 5 Drawing Figures

TELEPHONE CALL TIMER

The product of this invention is a timing unit mountable upon, or adjacent to, a conventional telephone instrument in such a way that the timing cycle for a call is started when the handset is removed from the telephone cradle or hook. It provides a signal at the beginning of every minute of the "off hook" condition. It is particularly directed to the timing of long distance telephone calls on which there has long been an established base charge for the first three minutes, with added charges thereafter. The timing cycle may be restarted by manual action of the calling party, as by depressing and releasing the activating member, so that the unit emits signals indicating the actual time of the connection, exclusive of the dialing time.

The first minutes of a telephone call pass by swiftly, and before either party is aware, charges have accumulated. For the average telephone subscriber making personal calls, three minutes usually provide ample time to announce safe arrival, conditions of health, transmittal or receipt of gifts, etc., etc., and it is for the purpose of limiting these calls that the present invention has been devised.

To avoid the need for closing the conversation abruptly, this invention gives a warning signal prior to the end of the 3-minute period,- in, say, $2\frac{1}{2}$ minutes of the call. There then remain 30 seconds for completing the conversation before the 3-minute period has elapsed, after which, for operator assisted calls, means extra charges. With the recent introduction of minute-by-minute telephone time charges for direct dialed calls, 3 minutes is suggested as a desirable period for a satisfying conversation. Hence the provision of a 3-minute timer unit.

For a private subscriber, aural signal means may be used, such as a beep which can be heard by both parties. For the use of a businessman in timing his calls, a visual signal may be provided. Thus, he is aware of the passage of time and the desirability of terminating the conversation, without the embarrassment of disclosing his time-consciousness to the person he has called. A beep loudness adjustment may also be provided with the aural signal means, for adjusting the sound to a comfortable level.

For a better understanding of the invention, reference may be had to the accompanying drawings, wherein FIG. 1 is a side elevation of the unit mounted adjacent a conventional desk telephone instrument with one end of the handset depressing the on-off plunger;

Figure 1:
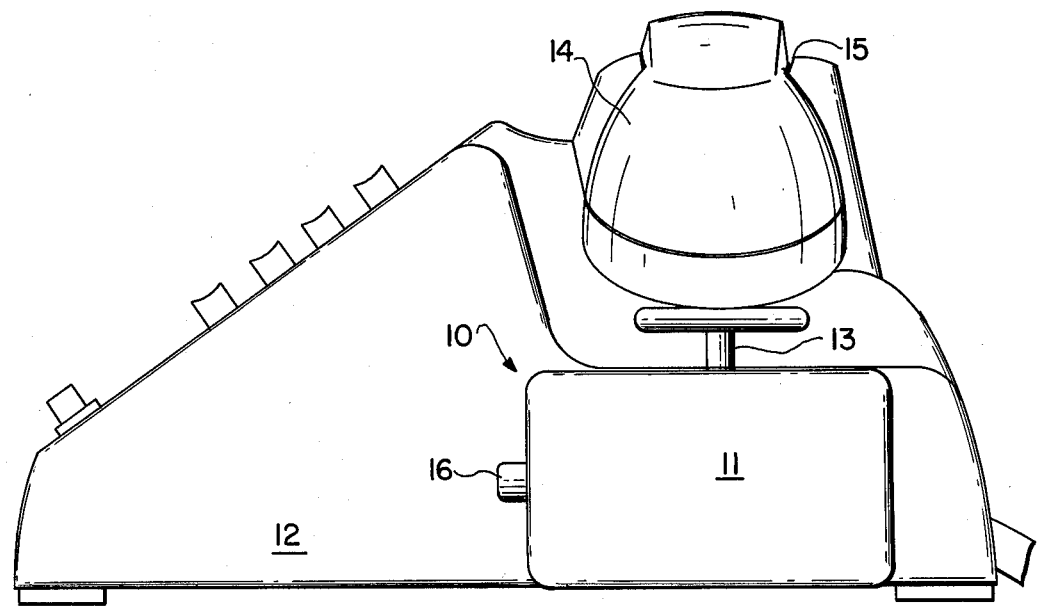
FIG. 1A shows a side elevation of the unit adjacent a wall-mounted telephone instrument, with a remote switch for energizing the unit.

Referring more particularly to the drawings,

In FIG. 1, timer unit 10 is shown having a quadrangular cover 11 attached to the border of a conventional telephone instrument 12 and an upwardly projecting plunger arm 13 which is permitted to rise when the handset 14 is lifted from the cradle 15, thus initiating the connection as indicated by the dial tone. Indicator 16 provides a visual warning means. The case may be attached to the telephone instrument by either mechanical, suction, or adhesive means. Power for the operation of the unit is provided by a battery contained within the unit case.

Figure 1A:
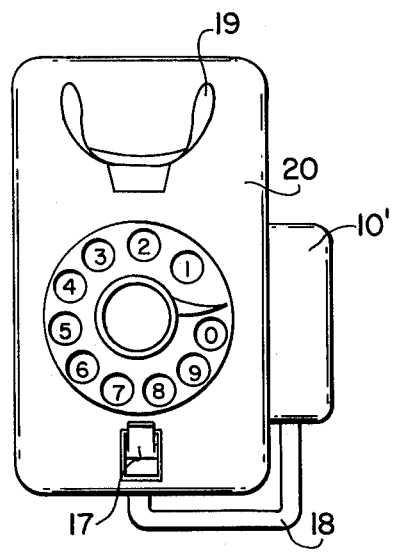

The unit for use with a wall telephone (shown with the handset removed) appears in FIG. 1A, and in this structure the timer unit 10' is activated by a remote switch 17 connected to timer 10' by wire pair 18. Switch 17 closes when the handset is removed from the cradle 19 of the wall telephone instrument 20. The switch 17 may consist of simple plunger operated contacts which are allowed to close when pressure from the lower end of the handset is removed.

Figure 2:
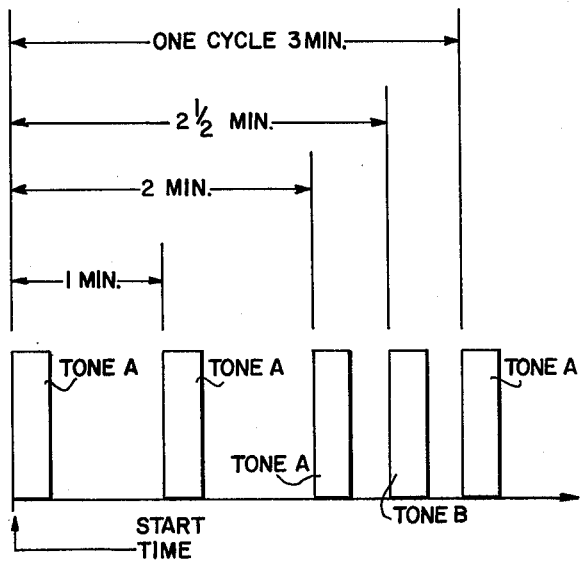
FIG. 2 is a timing diagram showing a typical beep tone sequence for an initial (3 minute) period-to-overtime situation, with the relative time segments not scaled.

The timing diagram of FIG. 2 shows, without scale of the relative parts, the starting point of a time cycle and the successive tones evidencing the passage of respective periods of the cycle. In this Figure it will be noted that the signals are identified as "tones". However, when visual signals are employed, light intensity may indicate the successive points and, if desired, the extra time signal may be set for flashing, rather than a steady light.

Figure 3:
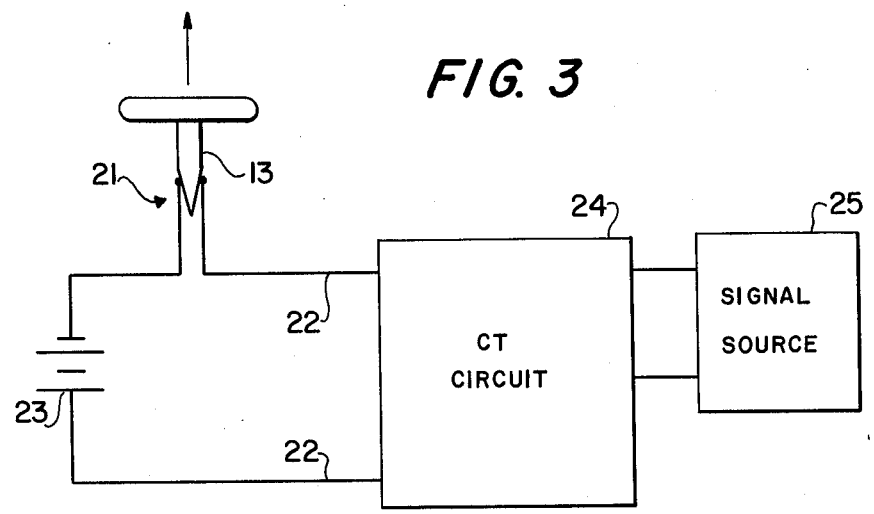
FIG. 3 is a block diagram of the timer, showing the components comprising the invention.

An example of the structure by which this timer unit achieves its purpose appears in FIG. 3, where plunger arm 13 is shown depressed into switch contact 21, thus preventing the contact from closing to activate the unit. When such switch contact is closed (upon lifting of the plunger arm), power enters the unit through connection 22 from the energy source 23 and passes into the circuit 24 which in turn transmits the power into the signal source 25. The switch contacts may be remoted from the main timer package as shown in FIG. 1A.

Figure 4:
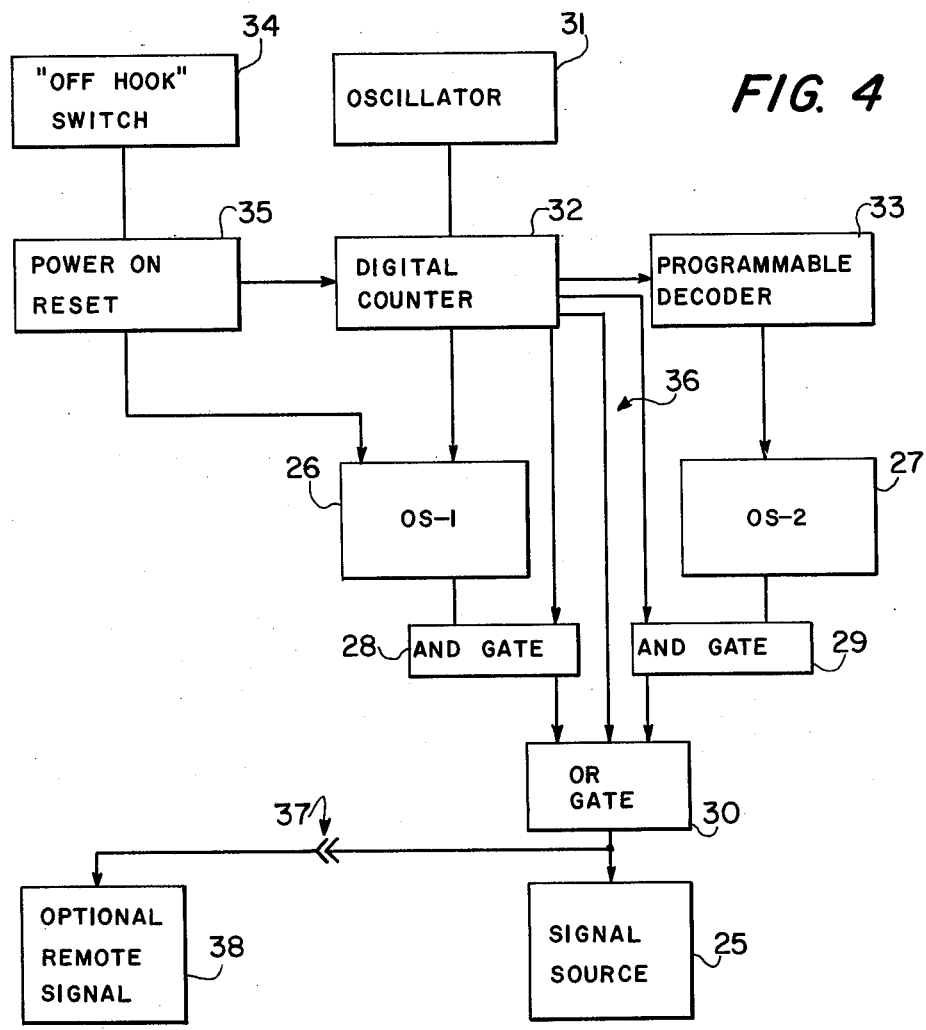
FIG. 4 is a block diagram showing the circuit function employed in the timer of this invention.

The circuit functions shown in FIG. 4 have the same relative complexity of those found in battery powered electronic wristwatch circuits and may be implemented using the same solid state technology.

An aural signal source may consist of a small speaker driven by a tone oscillator or an aural transducer directly driven by a DC voltage, the former technique being used in the circuit shown in FIG. 4.

The circuit comprises local signal source 25 which provides an aural and/or visual indication of elapsed time when pulsed by one shots (OS-1) 26 or (OS-2) 27. The one shot signal paths to the signal source are provided by logic gates 28, 29 and 30, which enable tone bursts to the signal source 25 for the OS pulse duration. Stable oscillator 31 drives digital counter 32 which outputs one pulse per minute to OS-1 26, thereby energizing the signal source 25 for the duration of the OS-1 pulse period (1 second typically). A programmable decoder 33 detects the $2\frac{1}{2}$ minute count and energizes OS-2 27 which in turn energizes the signal source for a shorter period (1/4 second typically) and at a different frequency. The "off-hook" switch 34 applies power to the circuit when the handset is lifted. The "power on" reset circuit 35 initializes digital counter 32 and triggers OS-1 26, thereby providing an initial "battery confidence" signal to the user as soon as the handset is lifted. A circuit connection 36 of a low frequency signal from the counter 32 to the OR gate 30 provides a low level background ticking sound in the speaker to alert the caller that time is passing. A connector 37 is included to allow the use of a remote signal source 38.

The programmable feature of the decoder allows the user to select optional warning times ($3\frac{1}{2}$ minutes, $4\frac{1}{2}$ minutes, etc.) by changing connection pins on the timer circuit board.

This invention is described herein principally as using an aural signal — a "beep". However, since it may be desirable to employ a visual signal, the language used herein is intended to apply to any signal emitting apparatus, whether aural or visual.

While the timer unit of this invention is activated upon the lifting of the telephone handset from the cradle or hook, it is important that the actual time cycle commence upon the completion of ringing, when the called party answers. For the purpose of timing the actual period of connection of the two parties, the timer may be reset by the calling party by depressing the plunger arm and immediately releasing it, when the called party answers.

Prior to the completion of 3 minutes of the cycle, a warning signal is given (after approximately 2½ minutes). Signal tones, for an aural signal, or light beams, for a visual signal, may be programmed to vary in sequence, duration, loudness (or light intensity), or any combination thereof, to indicate whether the signal is a warning of time about to expire, an indication of time expired, or a notice of overtime charges in effect.

The beep tone sequence shown in FIG. 2 covers a 3-minute cycle. Beep tones occur at the beginning of each minute of the cycle, and an unique three-minute warning tone occurs at 2½ minutes. In the instance of a prolonged conversation, the calling party may, by depressing the plunger, initiate a new cycle at the end of each 3-minute period. A check mark to note each such re-start of the cycle will provide a record for the calling party of the actual duration of the call.

The timer cycle terminates automatically when the handset is returned to its cradle or hook. If the call is terminated prior to the emission of the 3-minute signal, the caller is assured that he has not exceeded the three minutes (the "limit" previously decided upon by the calling party).

The energy source recommended for use with this product is a battery which provides sufficient power for the operation of the timer unit and eliminates the need for nuisance AC power cords.

Having thus disclosed my invention, I claim:

1. A timer unit for telephone calls comprising an energy source, counter means driven by an oscillator for generating timing signals for establishing time periods for use in generating tonal signals of different frequencies to provide an audible indication of the expiration of fixed time limits after the initiation of a telephone call, the signals of one frequency indicating the start of the time period and periodic one minute intervals during the time period including the end of said selected time period and the signals of another frequency indicating a time interval of approximately 2½ minutes after initiation of the call circuit means connected to said counter means and responsive to said timing signals for providing the audible indication of the start of the time period, the periodic intervals during the time period, including the end thereof, and the occurrence of the 2½ minute time interval, said circuit means including a first and a second logic circuit and a programmable decoder having an input connected to a first output of the counter means, an output of said decoder being connected to an input of said second logic circuit, a second output of said counter means being connected to an input of said first logic circuit, an OR gate, the output of said first and said second logic circuits being connected to first and second inputs of said OR gate, said OR gate having a third input connected to receive a third output from said counter and said OR gate having its output connected to activate said signal source so as to provide a first tonal output signal of said one frequency responsive to an output from said first logic circuit and a second tonal output of said another frequency responsive to an output from said second logic circuit whereby said second tonal output provides a warning signal prior to completion of the 3 minute time period.

2. A timer unit as set forth in claim 1 wherein said first and said second logic circuits each include a one shot and an AND gate, each said AND gate being connected to receive a fourth and a fifth output, respectively, of the counter means and the output of its associated one shot, the output of each AND gate being connected to an input of the associated OR gate.

3. A timer unit as set forth in claim 2 wherein said third counter output comprises a low frenquency signal to provide a low level background ticking sound at the signal source as a means of alerting the call initiator that time is passing.

4. A timer unit as set forth in claim 3 wherein said timer unit is contained within a housing having means for detachably mounting said unit to a conventional telephone unit, said control member being a plunger arm disposed adjacent said telephone instrument when said unit is mounted thereto such that the handset of said telephone unit rests on said plunger when said telephone is not in use, and upon lifting said handset, said plunger is caused to rise and operate said switch means to connect said counter means and said circuit means to the energizing source.

* * * * *